US012586303B2

(12) United States Patent
Xu et al.

(10) Patent No.: US 12,586,303 B2
(45) Date of Patent: Mar. 24, 2026

(54) GEOMETRY-AWARE THREE-DIMENSIONAL SYNTHESIS IN ALL ANGLES

(71) Applicant: Lemon Inc., Grand Cayman (KY)

(72) Inventors: Hongyi Xu, Los Angeles, CA (US);
Sizhe An, Los Angeles, CA (US);
Yichun Shi, Los Angeles, CA (US);
Guoxian Song, Los Angeles, CA (US);
Linjie Luo, Los Angeles, CA (US)

( * ) Notice: Subject to any disclaimer, the term of this patent is extended or adjusted under 35 U.S.C. 154(b) by 378 days.

(21) Appl. No.: 18/165,619

(22) Filed: Feb. 7, 2023

(65) Prior Publication Data
US 2024/0265628 A1    Aug. 8, 2024

(51) Int. Cl.
| | |
|---|---|
| *G06T 17/00* | (2006.01) |
| *G06T 3/4053* | (2024.01) |
| *G06T 7/194* | (2017.01) |
| *G06T 7/70* | (2017.01) |
| *G06T 11/00* | (2006.01) |

(Continued)

(52) U.S. Cl.
CPC ............ *G06T 17/00* (2013.01); *G06T 3/4053* (2013.01); *G06T 7/194* (2017.01); *G06T 7/70* (2017.01); *G06T 11/00* (2013.01); *G06T 15/10* (2013.01); *G06T 19/20* (2013.01); *G06T 2207/20081* (2013.01); *G06T 2207/20084* (2013.01); *G06T 2207/30196* (2013.01); *G06T 2210/12* (2013.01); *G06T 2210/22* (2013.01); *G06T 2219/2004* (2013.01); *G06T 2219/2016* (2013.01)

(58) Field of Classification Search
CPC .......... G06T 17/00; G06T 3/40; G06T 7/194; G06T 7/70; G06T 11/00; G06T 15/10; G06T 19/20
See application file for complete search history.

(56) References Cited

U.S. PATENT DOCUMENTS

2005/0283078 A1* 12/2005 Steen .................... A61B 8/463
600/447
2024/0096017 A1* 3/2024 Gao ........................ G06T 15/04

FOREIGN PATENT DOCUMENTS

CN         112020855 A  * 12/2020  .......... H04N 5/2224

OTHER PUBLICATIONS

Chan et al.: Efficient Geometry-aware 3D Generative Adversarial Networks [online] [Retrieved Jun. 3, 2025] <URL: https://arxiv.org/pdf/2112.07945> (Year: 2022).*

(Continued)

*Primary Examiner* — King Y Poon
*Assistant Examiner* — Vincent Alexander Providence
(74) *Attorney, Agent, or Firm* — Fish & Richardson P.C.

(57) ABSTRACT

A three-dimensional generative adversarial network includes a generator, a discriminator, and a renderer. The generator is configured to receive an intermediate latent code mapped from a latent code and a camera pose, generate two-dimensional backgrounds for a set of images, and generate, based on the intermediate latent code, multi-grid representation features. The renderer is configured to synthesize images based on the camera pose, a camera pose offset, and the multi-grid representation features; the camera pose offset being mapped from the latent code and the camera pose; and render a foreground mask. The discriminator is configured to supervise a training of the foreground mask with an up-sampled image and a super-resolved image.

20 Claims, 6 Drawing Sheets

(51) Int. Cl.
  *G06T 15/10*      (2011.01)
  *G06T 19/20*      (2011.01)

(56)              References Cited

OTHER PUBLICATIONS

Karras et al.: Progressive Growing of GANS for Improved Quality, Stability, and Variation [online] [Retrieved Jun. 3, 2025] <URL: https://arxiv.org/pdf/1710.10196> (Year: 2018).*

Niemeyer et al.: Campari: Camera-Aware Decomposed Generative Neural Radiance Fields [online] [Retrieved Jun. 3, 2025] <URL: https://arxiv.org/pdf/2103.17269> (Year: 2021).*

Taewoo et al.: K-Hairstyle: A Large-Scale Korean Hairstyle Dataset for Virtual Hair Editing and Hairstyle Classification [online] [Retreived Jun. 9, 2025] <URL: https://arxiv.org/pdf/2102.06288> (Year: 2021).*

Barron et al., "Mip-NeRF: A Multiscale Representation for Anti-Aliasing Neural Radiance Fields", Computer Science, Computer Vision and Pattern Recognition, last revised Aug. 14, 2021, https://arxiv.org/abs/2103.13415.

Chan et al., "Efficient Geometry-aware 3D Generative Adversarial Networks", Computer Science, Computer Vision and Pattern Recognition, last revised Apr. 27, 2022, https://arxiv.org/abs/2112.07945.

Guo et al., "Towards Fast, Accurate and Stable 3D Dense Face Alignment", Computer Science, Computer Vision and Pattern Recognition, Sep. 21, 2020, https://arxiv.org/abs/2009.09960v1.

Ivašić-Kos et al., "Human Detection in Thermal Imaging Using Yolo", ResearchGate, Proceedings of the 2019 5th International Conference on Computer and Technology Applications, 16, Apr. 2019, https://www.researchgate.net/publication/333360405_Human_Detection_in_Thermal_Imaging_Using_YOLO.

Karras et al., "A Style-Based Generator Architecture for Generative Adversarial Networks", Computer Science, Neural and Evolutionary Computing, last revised Mar. 29, 2019, https://arxiv.org/abs/1812.04948.

Karras et al., "Analyzing and Improving the Image Quality of StyleGAN", Computer Science, Computer Vision and Pattern Recognition, last revised Mar. 23, 2020, https://arxiv.org/abs/1912.04958.

Kim et al., "K-Hairstyle: A Large-scale Korean Hairstyle Dataset for Virtual Hair Editing and Hairstyle Classification", Computer Vision and Pattern Recognition, last revised Oct. 9, 2021, https://arxiv.org/abs/2102.06288.

Mildenhall et al., "NeRF: Representing Scenes as Neural Radiance Fields for View Synthesis", Computer Vision and Pattern Recognition, last revised Aug. 3, 2020, https://arxiv.org/abs/2003.08934.

Roich et al., "Pivotal Tuning for Latent-based Editing of Real Images", Computer Vision and Pattern Recognition, submitted Jun. 10, 2021, https://arxiv.org/abs/2106.05744.

Zhang et al., "The Unreasonable Effectiveness of Deep Features as a Perceptual Metric", Computer Vision and Pattern Recognition, last revised Apr. 10, 2018, https://arxiv.org/abs/1801.03924.

Zhou et al., "WHENet: Real-time Fine-Grained Estimation for Wide Range Head Pose", Computer Vision and Pattern Recognition, last revised Sep. 22, 2020, https://arxiv.org/pdf/2005.10353.pdf.

* cited by examiner

301

302

FIG. 3A                              FIG. 3B 400
410
Generation
latent code
Reconstruction
420
FIG. 4

GEOMETRY-AWARE THREE-DIMENSIONAL SYNTHESIS IN ALL ANGLES

FIELD

The embodiments described herein pertain generally to three-dimensional image synthesis in computer vision and graphics. More specifically, the embodiments described herein pertain to a three-dimensional generative adversarial network to achieve a full three-dimensional object synthesis in all angles.

BACKGROUND

Photo-realistic portrait image synthesis has been a continuous focus in computer vision and graphics, with a wide range of downstream applications in digital avatars, telepresence, immersive gaming, or the like. Some traditional approaches require a parametric textured mesh representation learned from large three-dimensional (3D) scan collections. However, the rendered images may lack fine details and have limited perceptual quality and expressiveness. Other traditional approaches may require supervision from multi-view images or 3D scans, which may be difficult to acquire and have limited appearance distribution as those images or scans are typically captured in controlled environments. Some generative adversarial network (GAN) approaches operate on two-dimensional convolutional networks without modeling the underlying 3D scenes, and thus 3D consistency may not be enforced when synthesizing head images under various poses. Other 3D GAN approaches are limited to synthesis in near-frontal views or limited to near-frontal views, or hard to preserve 3D consistency in large view angles.

SUMMARY

Features in the embodiments disclosed herein provide a 3D GAN framework that may synthesize view-consistent full object (e.g., a full head, etc.) images with single-view images. With the help of large-scale full-head annotated training image dataset, the 3D GAN framework described herein may generate diverse images in terms of gender, races, appearances, etc., and may generate images and shapes in excellent quality and viewable from all angles (e.g., in 360 degrees, etc.). The 3D GAN framework described herein may enable authentic multi-view-consistent full-head image synthesis in all angles and demonstrate compelling qualitative and quantitative results compared with existing 3D GANs.

The 3D GAN framework described herein may provide a 360-degree photo-realistic reconstruction with highly detailed geometry from single-view real portrait(s). Compared with existing models, the generative model in the 3D GAN framework described herein may generate superior photo-realistic head images for all camera poses while retaining multi-view consistency. The 3D GAN framework described herein may deliver photo-realism with fine details at diverse appearances, e.g., ranging from a shaved head with glasses to long curly hairstyles, etc. The 3D GAN framework described herein may consistently generate high-fidelity background-free 3D head geometry with various hairstyles. Compared with existing models, the 3D GAN framework described herein may achieve a high performance for back head generation, introducing minor or low computation overhead, but with significant image synthesis quality improvements. The 3D GAN framework described herein may synthesize view-consistent 3D heads viewable from all angles with diverse appearances and accurate 3D geometry.

In one example embodiment, a method for generating three-dimensional synthesized images includes pre-processing a first set of images and a second set of images by scaling the first set of images to a predetermined size and aligning the first set of images at a center of a reference, centering a bounding box at the reference for the second set of images, and adjusting a scale and a translation of the center of the reference with constant offsets for the second set of images. The method also includes tuning a volume rendering for each image of the first and second sets of images by associating each image with a latent code and synthesizing the latent code at a view of a camera pose, mapping a camera pose offset from the latent code and the camera pose, and generating synthesized images based on the camera pose and the camera pose offset.

In another example embodiment, a three-dimensional generative adversarial network includes a generator, a discriminator, and a renderer. The generator is configured to receive an intermediate latent code mapped from a latent code and a camera pose, generate two-dimensional backgrounds for a set of images, and generate, based on the intermediate latent code, multi-grid representation features. The renderer is configured to synthesize images based on the camera pose, a camera pose offset, and the multi-grid representation features; the camera pose offset being mapped from the latent code and the camera pose; and render a foreground mask. The discriminator is configured to supervise a training of the foreground mask with an up-sampled image and a super-resolved image.

In yet another example embodiment, a non-transitory computer-readable medium having computer-executable instructions stored thereon that, upon execution, cause one or more processors to perform operations including pre-processing a first set of images and a second set of images by scaling the first set of images to a predetermined size and aligning the first set of images at a center of a reference, centering a bounding box at the reference for the second set of images, and adjusting a scale and a translation of the center of the reference with constant offsets for the second set of images. The operations also include tuning a volume rendering for each image of the first and second sets of images by associating each image with a latent code and synthesizing the latent code at a view of a camera pose mapping a camera pose offset from the latent code and the camera pose, and generating synthesized images based on the camera pose and the camera pose offset. The operations further includes disentangling foreground from background of the synthesized images by generating two-dimensional backgrounds for the first and second sets of images, determining a foreground mask during the volume rendering, supervising, by a discriminator, a training of the foreground mask with an up-sampled image and a super-resolved image, and augmenting the tri-plane with a depth dimension.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

FIG. 4 illustrates an example that includes inputs and outputs of a 3D GAN, arranged in accordance with at least some embodiments described herein.

DETAILED DESCRIPTION

Figure 1:
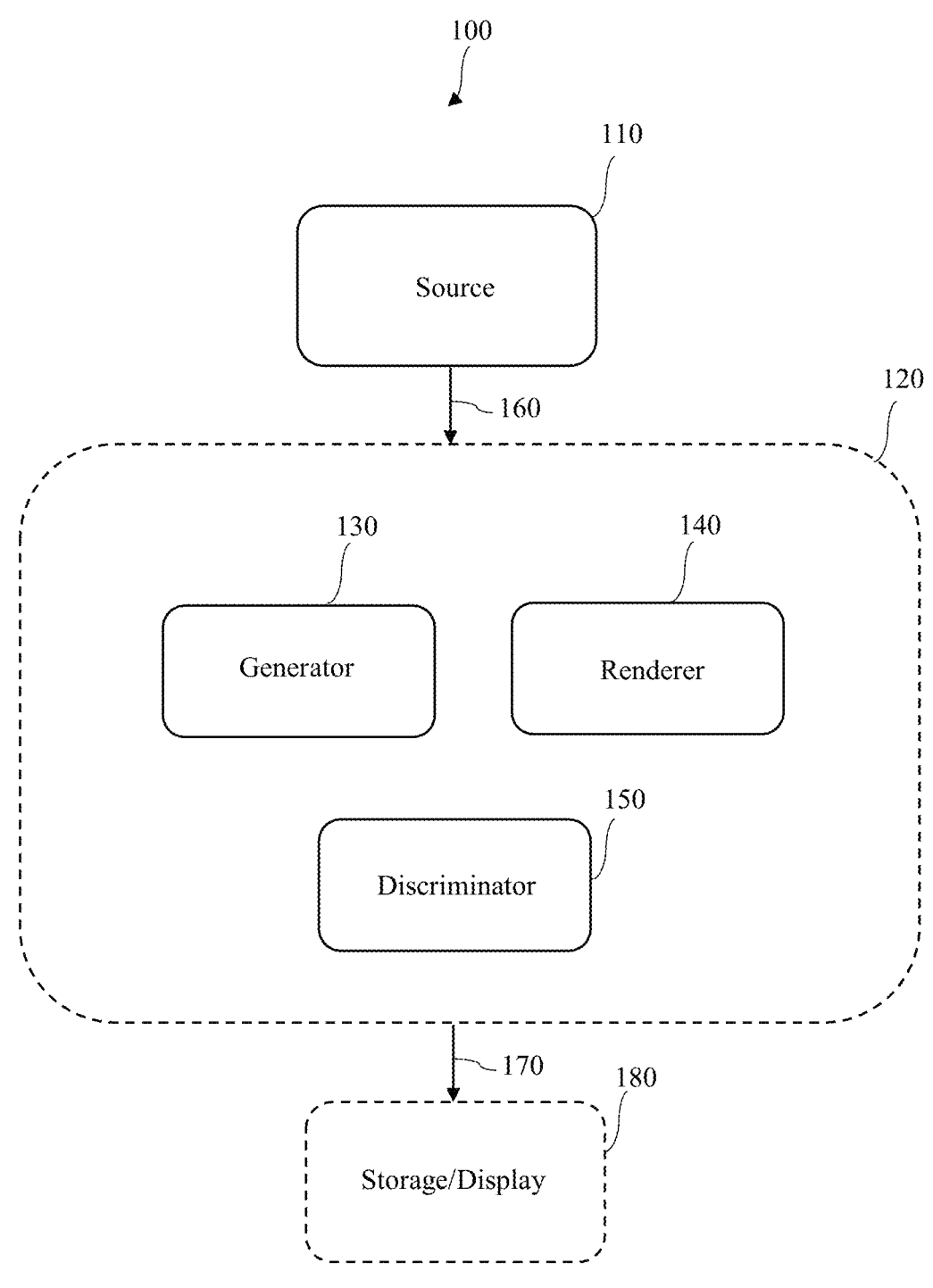
FIG. 1 illustrates an example system in which a 3D GAN that achieves full 3D object synthesis in all angles may be implemented, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It is to be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, "latent code" (e.g., latent code z, etc.) in a latent space may refer to a vector containing random values sampled from a Gaussian (normal) distribution and/or Gaussian noise. It is to be appreciated that "latent space" may refer to a simpler (e.g., lower-dimensional, etc.), hidden representation of a data point.

As referenced herein, "camera pose" may refer to the position and orientation of a camera in a coordinate system, with respect to six degrees of freedom, using different representations, e.g., a transformation matrix. It is to be appreciated that the six degrees of freedom may be grouped into two categories: translations and rotations. Translations are linear, horizontal straightness, and vertical straightness. Rotations are pitch, yaw, and roll. Camera pose may include the estimation of objects' poses in scenes or scenarios for the camera. In an example, embodiment, camera pose may be estimated from training images from an image dataset, e.g., using a camera pose estimator.

As referenced herein, a "generative adversarial network" or "GAN" may refer to an algorithmic architecture that uses two neural networks, pitting one against the other (thus the "adversarial") in order to generate new, synthetic instances of data that can pass for real data. GANs are typically used in image generation, video generation, voice generation, or the like. It is to be understood that a GAN may include a generator that learns to generate plausible data, and a discriminator. The generated instances become negative training examples for the discriminator. The discriminator learns to distinguish the generator's fake data from real data.

As referenced herein, "rendering" or "neural rendering" may refer to a class of deep image and video generation approaches that enable explicit or implicit control of scene properties such as illumination or lighting, camera parameters, pose, geometry, appearance, shapes, semantic structure, etc. It is to be understood that "rendering" or "neural rendering" may refer to a method, based on deep neural networks and physics engines, which can create novel images and video footage based on existing scenes. It is also to be understood that the functions of "rendering" or "neural rendering" may be implemented by a "renderer" or "neural renderer".

As referenced herein, "super-resolution" imaging or "super resolution" imaging may refer to a class of techniques that enhance and/or increase the resolution of an imaging system. Image super resolution may refer to a task of enhancing the resolution of an image from low-resolution to high-resolution, or recovering high-resolution image(s) from low-resolution image(s). It is to be understood that the functions of "super resolution" may be implemented by a super resolution module. It is also to be understood that the output image of the super resolution module may refer to "super-resolved" image(s). It is also to be understood that "super resolution" may include one of more of different "up-sampling" processes.

As referenced herein, "up-sample" or "up-sampling" may refer to an image-editing action or process that enlarges the original image, making up (or interpolating) additional pixels to fill in the gaps. "Up-sampling" may refer to the increasing of the spatial resolution while keeping the two-dimensional representation of an image. It is to be understood that up-sampling may be used for zooming in on a small region of an image, and for eliminating the pixelation effect that arises when a low-resolution image is displayed on a relatively large frame.

As referenced herein, "bilinear up-sampling" may refer to one of the up-sampling processes that creates a larger resolution image where every sample is created from bilinear filtering of a smaller resolution image. It is to be understood that bilinear filtering (or "bilinear sampling" or "bilinear interpolation") may refer to a method in computer graphics for choosing the color of a texture, and/or a method for interpolating functions of two variables (e.g., x and y) using repeated linear interpolation. It is also to be understood that bilinear interpolation may be applied to functions sampled on a two-dimensional rectilinear grid, and/or to be generalized to functions defined on the vertices of (a mesh of) arbitrary convex quadrilaterals. It is further to be understood that the bilinear interpolation may first perform linear interpolation on one axis of the image and then performs on the other axis, and result in a quadratic interpolation with a receptive field-sized 2×2.

As referenced herein, "multilayer perceptron" or "MLP" may refer to a feedforward artificial neural network that may generate a set of outputs from a set of inputs. It is to be under stood that an MLP may be characterized by several layers of input nodes connected as a directed graph between the input and output layers.

As referenced herein, a "model" or "framework" may refer to software, such as algorithms and/or programs, hardware or firmware, or any combination thereof that supports machine learning, natural language understanding, natural language processing, speech recognition, computer vision, etc.

As referenced herein, "tri-plane" representation may refer to a feature representation that combines an explicit back-bone, which produces features aligned on three orthogonal planes, with a small implicit decoder. In an example embodiment, StyleGAN2® or other suitable generative model may be used as the backbone so that the qualities of the backbone, including a well-behaved latent space, may be inherited.

As referenced herein, "discriminator" may refer to a classifier that distinguishes real data from the data created by the generator. It is to be understood that a discriminator classifies both real data and fake data from the generator, and may use any network architecture appropriate to the type of data the discriminator is classifying. It is also to be understood that the discriminator may determine whether the input samples are real or fake. The input samples may be real samples coming from the training data, or fake coming from the generator.

As referenced herein, "mapping network" may refer to a function or algorithm that may embed an input latent code to intermediate latent space which may be used as a style and may be incorporated at each block of synthesis network.

With the features in the embodiment disclosed herein, given a large collection of two-dimensional in-the-wild unstructured images of human head from a wide camera pose distributions, including frontal and the back of the head, a 3D-aware GAN (or a three-dimensional generative adversarial network (3D GAN)) may be trained for high-quality full 3D head synthesis in all angles (e.g., in 360 degrees, etc.). It is to be understood that illustrative numbers are used in describing features in the embodiments described herein. However, embodiments described herein are not limited to the number(s) described. That is, the number(s) described herein are provided for descriptive purposes only and are not intended to be limiting.

FIG. 1 illustrates an example system 100 in which a 3D GAN that achieves full 3D object synthesis (e.g., geometry-aware full 3D head synthesis, etc.) in all angles (e.g., a 3D head may be viewed when rotating the 3D head in 360 degrees about the X, Y, or Z axis passing through a middle or center of the 3D head, etc.) may be implemented, arranged in accordance with at least some embodiments described herein.

The system 100 may include a source 110 and a 3D GAN 120. In an example embodiment, the source 110 may be an electronic device (e.g., 600 of FIG. 6, etc.) including but not limited to a camera, a video recorder, a smartphone, a tablet computer, a laptop computer, a desk computer, and/or any other suitable electronic device. In another example embodiment, the source 110 may be a storage, a database, a file, or the like. The source 110 may provide input 160 to the 3D GAN 120. In an example embodiment, the 3D GAN 120 may be a function, an operation, an action, an algorithm, an application, or the like that is implemented, designed, stored, executed, performed, or otherwise hosted in an electronic device (e.g., 600 of FIG. 6, etc.) including but not limited to a server, a cloud network, a smartphone, a tablet computer, a laptop computer, a desk computer, and/or any other suitable electronic device. In an example embodiment, the input 160 may include a text, an image, an audio, a video, a latent code, a camera pose, etc. that is captured, generated, obtained, user-entered, etc. via the source 110. In another example embodiment, the input 160 may include a text, an image, an audio, a video, a latent code, a camera pose, etc. that is stored in the source 110.

The 3D GAN 120 includes a generator 130, a renderer 140, and a discriminator 150. In an example embodiment, the 3D GAN 120 may receive input 160 from the source 110, generate image(s) 170 based on the received input 180, and/or be trained to generate image(s) 170 based on the received input 160 (see e.g., descriptions of FIGS. 2-5). The generated image(s) 170 may be stored in, displayed in, or sent to a device 180. In an example embodiment, the device 180 may be a storage device (e.g., 640 of FIG. 6), an output/display device 180 (e.g., 635 of FIG. 6), and/or an electronic device 180 (e.g., 600 of FIG. 6).

In an example embodiment, the generator 130 (see detailed description in FIG. 2) may generate a multi-grid (e.g., tri-grid, etc.) neural volume representation. Compared with tri-plane representation, which may introduce strong projection ambiguity for 360-degree camera poses, resulting in "mirrored face" on the back head, the 3D tri-grid volume representation may disentangle the frontal features from the back head while maintaining the efficiency of the tri-plane representation.

In an example embodiment, the renderer 140 (see detailed description in FIG. 2) may be tuned based on a two-stage alignment scheme. It is to be understood that obtaining well-estimated camera poses of in-the-wild back head images for 3D GANs training may be extremely difficult. It is also to be understood that in-the-wild image may refer to uncontrolled imagery, as opposed to images taken in lab environments or posed pictures such as driver's license or passport pictures or mug shots. It is further to be understood that an image alignment gap may exist between the back head images and the frontal images with detectable facial landmarks, and that the alignment gap may cause a noisy appearance and unappealing head geometry. The two-stage alignment scheme may robustly align images from any view consistently, and may significantly decrease the learning difficulty of 3D GANs. A camera self-adaptation module (see description of FIG. 2) may be implemented to dynamically adjust the positions of rendering cameras to accommodate the alignment drifts in the back head images.

In an example embodiment, the discriminator 150 (see detailed description in FIG. 2) may be a foreground-aware tri-discriminator. It is to be understood that existing 3D GANs may not be able to separate foreground and background, inducing 2.5D head geometry. It is to be understood that the background, typically formulated as a wall structure, may be entangled with the generated head in 3D and therefore prohibits rendering from large camera poses. The foreground-aware tri-discriminator may learn the decomposition of the foreground head in 3D space by distilling the prior knowledge in two-dimensional (2D) image segmentation.

It is to be understood that the 3D GAN 120 may enable view-consistent and high-fidelity full-head image synthesis with detailed geometry (i.e., geometry-aware synthesis) of the head, which may be rendered in 360 degrees. The tri-grid formulation (by the generator 130) may balance efficiency and expressiveness in representing 3D 360-degree head scenes. The foreground-aware tri-discriminator 150 may disentangle 3D foreground head modeling from 2D background synthesis. The two-stage image alignment scheme may adaptively accommodate imperfect camera poses and misaligned image cropping, enabling training of the 3D GAN 120 from in-the-wild images with wide camera pose distribution.

Figure 2:
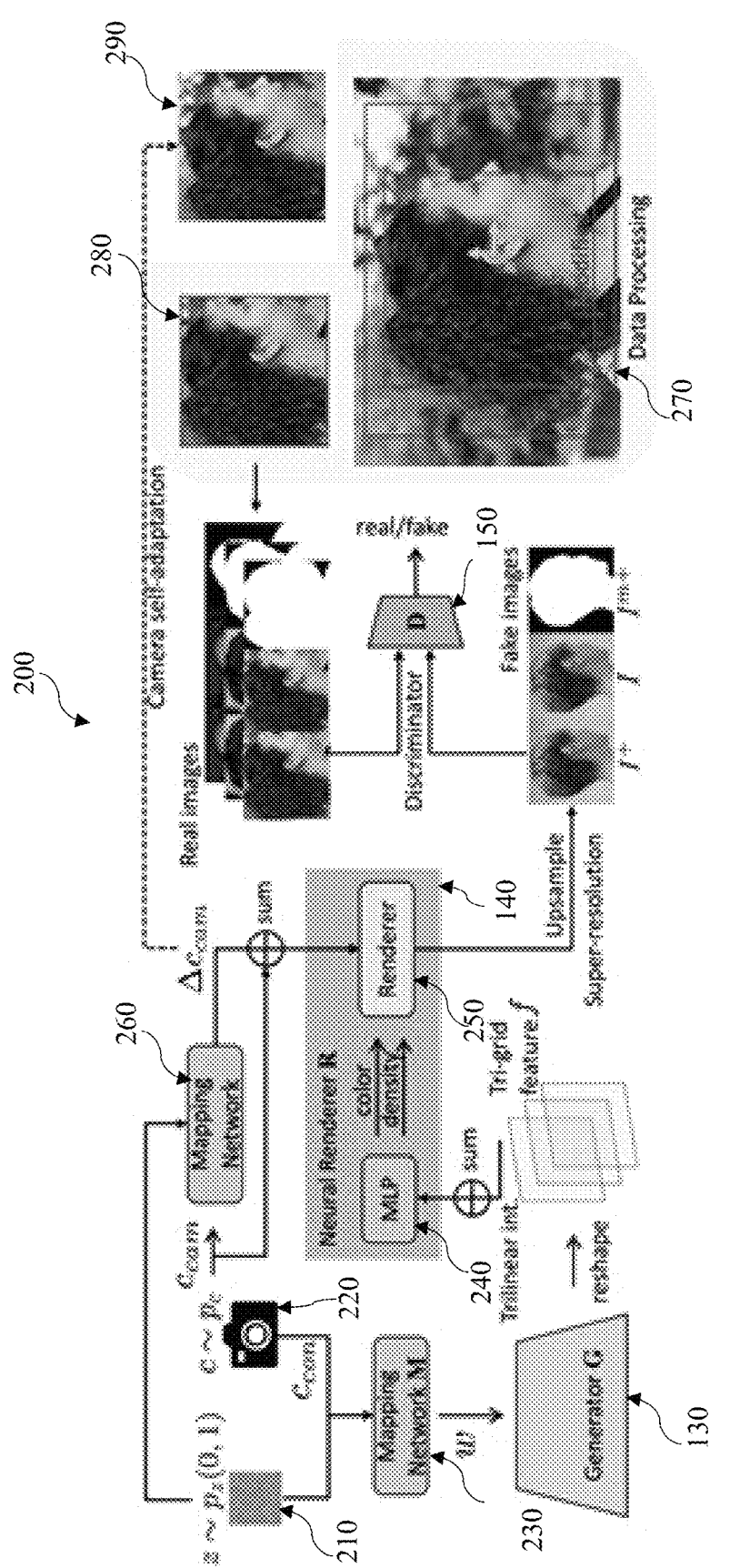
FIG. 2 is a schematic view of an example 3D GAN, arranged in accordance with at least some embodiments described herein.
Figure 3:
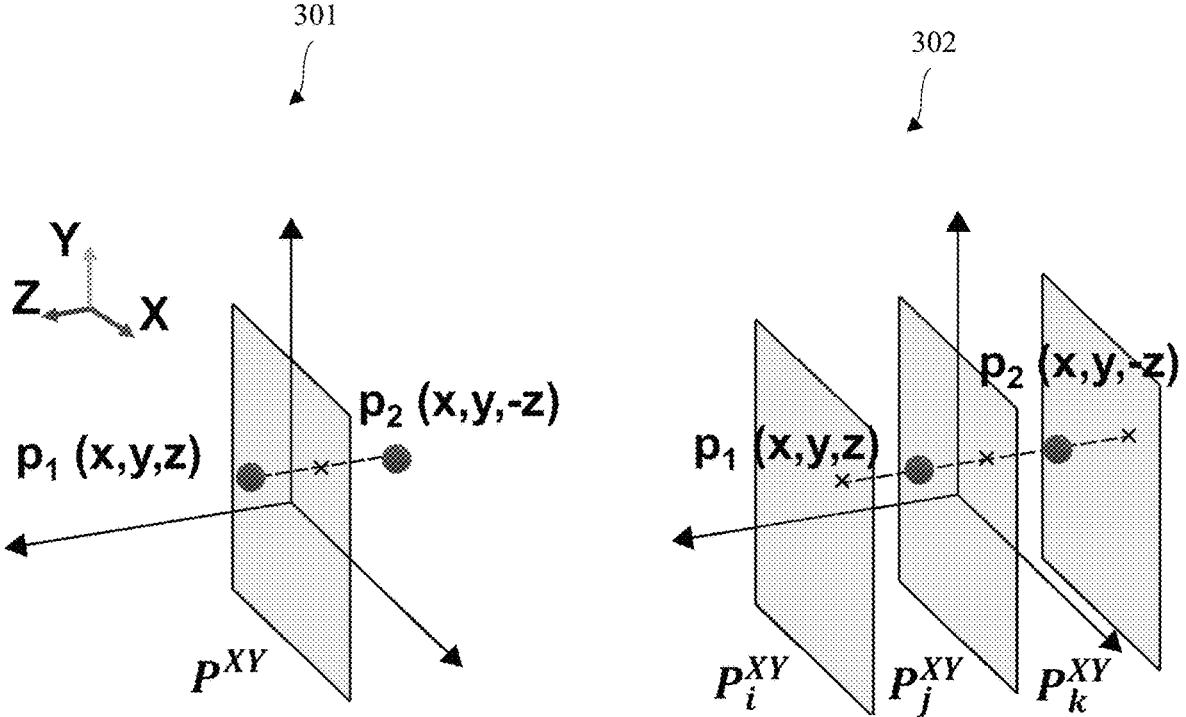
FIG. 3A illustrates an example of data point projections with tri-plane representation, arranged in accordance with at least some embodiments described herein.
FIG. 3B illustrates an example of data point projections with tri-grid representation, arranged in accordance with at least some embodiments described herein.

FIG. 2 is a schematic view of an example 3D GAN 200, arranged in accordance with at least some embodiments described herein. In an example embodiment, the 3D GAN 200 may be the 3D GAN 120 of FIG. 1.

As shown in FIG. 2, the 3D GAN 200 includes a generator G (130), a renderer R (140), and a discriminator D (150). In an example embodiment, the generator 130 may be a foreground-aware generator (e.g., based on StyleGAN2® or other suitable generative model). The renderer 140 may be a neural renderer. The discriminator 150 may be a foreground-aware tri-discriminator.

In an example embodiment, the latent code z (210) may be sampled from a Gaussian (normal) distribution and may be a Gaussian noise. The camera pose 220 (including the conditioned camera pose Ccon and/or the rendering camera pose Ccam) may be estimated from training images from an image dataset, e.g., using a camera pose estimator. A mapping network M (230) may map the latent code z (210) and conditioned camera pose Ccon (220) into an intermediate latent code (e.g., a style code, etc.) w.

In an example embodiment, the generator 130 may take the intermediate latent code w as an input to obtain the 3D tri-grid representation features f (see also description in FIGS. 3A and 3B). In addition, to disentangle the foreground from the background, the generator 130 (or an additional generator) may generate two-dimensional backgrounds for the training images at the same resolution of raw (unprocessed) feature image. Furthermore, the generator 130 may generate a multi-grid (e.g., tri-grid, etc.) neural volume representation features f (see descriptions in FIGS. 3A and 3B).

In an example embodiment, the neural renderer 140 includes an MLP 240 and a volume renderer 250. The sum of the features f (e.g., with trilinear interpolation, etc., see description in FIGS. 3A and 3B) can be used as an input by the MLP 240 to generate output layers (e.g., color, density, etc.) for the volume renderer 250.

It is to be understood that the data processing module 270 of the 3D GAN 200 is shown in the right side of FIG. 2. In an example embodiment, the real images are cropped with modified bounding boxes (see the inner box of 270, see also description of FIG. 5) which may differ at scale and location due to lacking accurate facial landmarks. In an example embodiment, the outer box of 270 may be a bounding box provided by a human detector and centered at a detected head, and may have a non-square shape (e.g., having a rectangular shape, etc.). The inner box of 270 may be a modified bounding box such that the image may be cropped at a head scale and center, and may have a square shape. With the camera self-adaptation scheme (see detailed description in FIG. 5), the rendering camera pose Ccam 220 may be able to correct itself (e.g., with ΔCcam, see description of FIG. 5) to generate images with consistent scale and location (see e.g., the correction or adjustment from image 280 to image 290, which is a corrected/adjusted image). The camera pose offset ΔCcam may be mapped (e.g., via a mapping network 260) from the latent code z and the rendering camera pose Ccam 220. In an example embodiment, the camera self-adaptation module may include the latent code z, the rendering camera pose Ccam, the mapping network 260 (to map the camera pose offset ΔCcam from the latent code z and the rendering camera pose Ccam), and/or the sum module (that sums the rendering camera pose Ccam and the camera pose offset ΔCcam, or adjusts the rendering camera pose Ccam based on the camera pose offset ΔCcam).

In an example embodiment, with the tri-grid representation features f and adjusted rendering camera pose Ccam (that is adjusted by or summed with ΔCcam), the renderer 140 may synthesize or render images including a foreground mask. The rendered images may be up-sampled (e.g., by a super resolution module (not shown)) to generate a super-resolved image $I^+$, a bilinear up-sampled image I, and a super-resolved mask $I^{m+}$. The discriminator 150 may critique ($I^+$, I, $I^{m+}$) along with real images.

It is to be understood that after the 3D GAN 200 is trained, the 3D GAN 200 may receive input (e.g., an image, a latent code, etc. such as 160 of FIGS. 1 and 410 and/or 420 of FIG. 4), and generate and/or output photo-realistic full-head image(s) and/or 3D portraits (see e.g., 170 of FIG. 1 and the outputs in FIG. 4). In an example embodiment, the output images may be generated by, e.g., the renderer 140 and/or the super resolution module (not shown). In an example embodiment, the output images may be the super-resolved image(s) $I^+$ and/or the bilinear up-sampled image(s) I.

FIG. 3A illustrates an example 301 of data point (e.g., volume point, etc.) projections with tri-plane representation, arranged in accordance with at least some embodiments described herein. FIG. 3B illustrates an example 302 of data point (e.g., volume point, etc.) projections with tri-grid representation, arranged in accordance with at least some embodiments described herein.

FIGS. 3A and 3B show a comparison between tri-plane and tri-grid representations in Z axis. It is to be understood that the tri-grid representation may be generated by augmenting the tri-plane with a depth dimension. It is also to be understood that the augmentation may be performed on X, Y, and/or Z axis. It is further to be understood that the tri-plane representation may be augmented to be multi-grid (e.g., two-, three-, four-, or more-grid) representation (see also description of FIG. 5).

It is to be understood that with tri-plane representation (see FIG. 3A), projections of two different points ($P_1(x, y, z)$ and $P_2(x, y, -z)$) may share the feature from the plane $P_i^{XY}$, which may introduce representation ambiguity. With tri-grid representation (see FIG. 3B), the features for the two points ($P_1(x, y, z)$ and $P_2(x, y, -z)$) are tri-linearly interpolated from two different planes (two planes $P_i^{XY}$ and $P_j^{XY}$, and two planes $P_j^{XY}$ and $P_k^{XY}$, respectively), thus generating distinct features.

For example, as shown in FIG. 3A, a point on the front face (e.g., $P_1(x, y, z)$) and a point on the back hair (e.g., $P_2(x, y, -z)$) of a head may be projected to a same point on the XY plane $P^{XY}$ (orthogonal to the Z axis). It is to be understood that although the other two planes (XZ and YZ) may theoretically provide complementary information to alleviate the projection ambiguity, when there is less visual supervision from the back or when the structure of the back head is challenging to learn, the projection ambiguity problem may remain. The tri-plane representation is prone to borrow features from the front face to synthesize the back head, referred to as "mirroring-face" artifacts.

In an example embodiment, to reduce the inductive bias of the tri-plane representation, the formulation of the tri-plane representation may be lifted into a higher dimension by augmenting the tri-plane representation with an additional depth dimension, as a tri-grid (or multi-grid) representation. That is, instead of having three planes with a shape of H×W×C, where H and W being the spatial resolution and C being the number of channel, each of the tri-grid may have a shape of D×H×W×C, where D represents the depth. A multi-grid representation may refer to a tri-plane representation augmented with a depth dimension (with each plane of the tri-plane being expanded in the depth dimension multiple times).

For example, to represent spatial features on the XY plane, tri-grid representation may have D axis-aligned feature planes PIXY (where i=1, . . . , D) uniformly distributed along the Z axis. Any 3D spatial point may be queried by projecting the point's coordinate onto each of the tri-grid, retrieving the corresponding feature vector by using tri-linear interpolation. As such, for two points sharing the same projected coordinates but with different depths, the corresponding feature may be likely to be interpolated from non-shared planes (see FIG. 3B).

It is to be understood that the formulation of tri-grid representation may disentangle the feature presentation of the front face and back head, and therefore alleviating the "mirroring-face" artifacts. It is also to be understood that the tri-grid representation may be synthesized as 3×D feature planes using the generator 130. That is, the number of output channels of the generator 130 may be increased by D times. Thus, tri-plane representation may be regarded as a naïve case of the tri-grid representation with D=1. It is further to be understood that the depth D of the tri-grid representation may be tunable and a larger D may offer more representation power at the cost of additional computation overhead. In an example embodiment, a small value of D (e.g. D=3, etc.) may be sufficient in feature disentanglement while still maintaining its efficiency as a 3D scene representation.

FIG. 4 illustrates an example 400 that includes inputs and outputs of the 3D GAN (e.g., 120 of FIG. 1 or 200 of FIG. 2), arranged in accordance with at least some embodiments described herein.

FIG. 4 illustrates that the 3D GAN described herein may enable 360-degree view-consistent photo-realistic full-head image synthesis with high-fidelity geometry, enabling authentic 3D portraits creation from a single-view image. The first two rows of FIG. 4 illustrate 3D portrait creation or generation (410) from a latent code (as an input to the 3D GAN). The last row of FIG. 4 illustrates 3D portrait reconstruction (420) from an image (as an input to the 3D GAN). The first column of FIG. 4 shows input(s) (410 or 420) to the 3D GAN, and the remaining columns of FIG. 4 show output(s) from the 3D GAN.

It is to be understood that the 3D GAN described herein may provide a single-view GAN inversion functionality, which may demonstrate a full-head reconstruction from a single-view portrait (input image) using the 3D GAN's generative latent space. To achieve such functionality, an optimization may be performed to find the corresponding latent code z for the input image. To further improve reconstruction quality, pivotal tuning inversion may be performed to alter the generator parameters with a fixed optimized latent code z. From the single-view input image, the 3D GAN described herein may not only reconstruct photo-realistic image and high-fidelity geometry, but also enable view synthesis in 360-degree, including viewing of a large camera pose and the back head.

Figure 5:
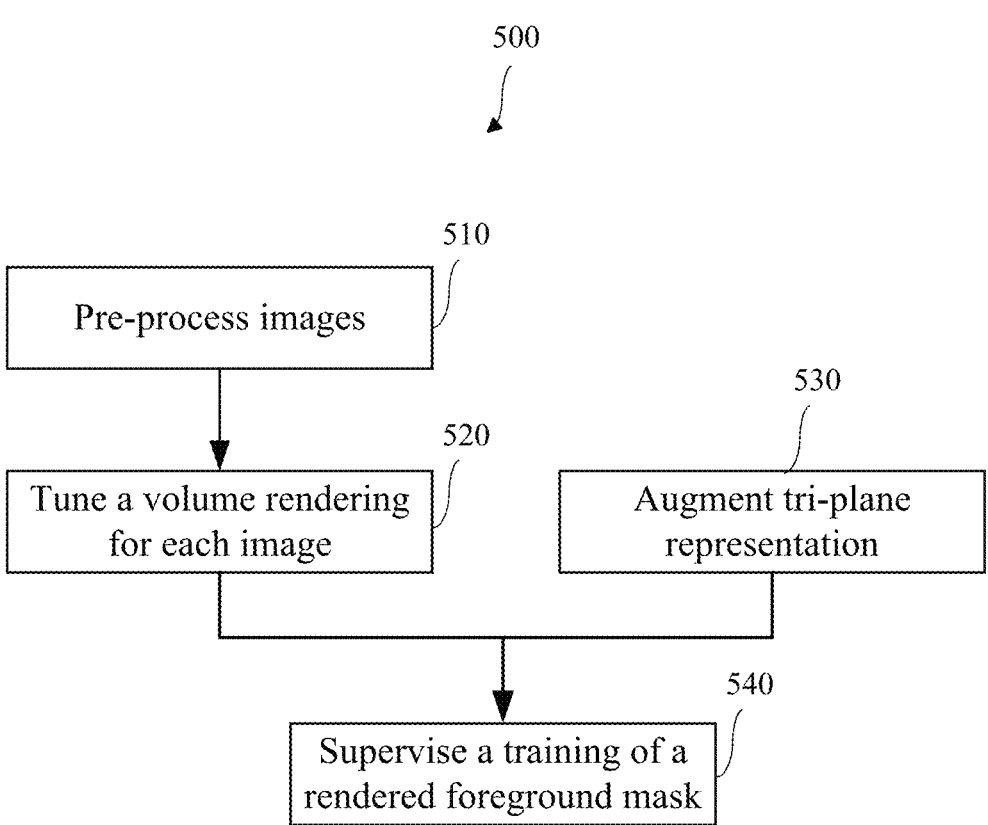
FIG. 5 is a flow chart illustrating an example processing flow of a 3D GAN, in accordance with at least some embodiments described herein.

FIG. 5 is a flow chart 500 illustrating an example processing flow of the 3D GAN (e.g., 120 of FIG. 1 or 200 of FIG. 2), in accordance with at least some embodiments described herein.

It is to be understood that foreground-background entanglement may prohibit large pose rendering, that strong inductive bias from tri-plane representation may cause mirroring-face artifacts on the back head, and that noisy camera labels and inconsistent cropping of back head images may be presented. To address such problems, the 3D GAN described herein provides a background generator and a tri-discriminator for decoupling foreground and background, an efficient yet more expressive tri-grid representation while still being compatible with StyleGAN® (or other suitable generative model) backbone, and a two-stage image alignment scheme with a camera self-adaptation module (see also FIG. 2) that dynamically adjusts rendering camera pose during training.

It is to be understood that the processing flow 500 disclosed herein can be conducted by one or more processors (e.g., the central processor unit 605 of FIG. 6 and/or any other suitable processor), unless otherwise specified.

It is also to be understood that the processing flow 500 can include one or more operations, actions, or functions as illustrated by one or more of blocks 510, 520, 530 and 540. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 500 may begin at block 510 or block 530.

At block 510 ("Pre-process images", see also description in FIG. 2), the processor may pre-process the images such as training images including frontal images (a first set of images) and back head images and/or large camera pose images (a second set of images). For images with detectable facial landmarks (the first set of images), the processor may scale the faces to a similar size and align the faces at the center of the head e.g., using a face pose estimator. For images with large camera poses (the second set of images), the processor may run or perform a head pose estimator that provides a roughly-estimated camera pose, and a human detector with a bounding box centered at the detected head. To crop the images at a consistent head scale and center, the processor may apply both the human detector and the face pose estimator on a batch of front-face images, from which the processor may adjust the scale and translation of the head center (e.g., determined by the head pose estimator) with constant offsets, e.g., for the second set of images.

The processor may pre-process all head images with labeled camera parameters and in a consistent alignment. Due to the presence of various hairstyles, there may still be inconsistency in the alignment of back head images, inducing learning difficulties for the 3D GAN to interpret the complete head geometry and appearance. It is to be understood that block 510 may be a first stage of the two-stage processing of a self-adaptive camera alignment process. Processing may proceed from block 510 to block 520.

At block 510 ("Tune a volume rendering for each image", see also description in FIG. 2), the processor may perform a self-adaptive camera alignment scheme to fine-tune the transformation of volume rendering frustum for each training image. For example, the 3D-aware GAN (i.e., the 3D GAN, e.g., 120 of FIG. 1 or 200 of FIG. 2) or the processor may associate each image with a latent code z that embeds the 3D scene information of geometry and appearance, which can be synthesized at a view of Ccam (see FIG. 2). It is to be understood that Ccam might not align well with the image content for the training images; and thus it may be difficult for the 3D GAN or the processor to determine a consistent full head geometry. Therefore, the 3D GAN or the processor may co-learn a residual camera transformation ΔCcam (i.e., a camera pose offset) together with the adversarial training. The 3D GAN or the processor may regularize the magnitude of the ΔCcam with a L2 norm (or normalization or regularization). It is to be understood that L2 norm may refer to a normalization that optimizes the mean cost (whereas L1 norm reduces a median explanation) which may be used as a performance measurement. The 3D GAN or the processor may dynamically self-adapt the image alignment with refined correspondence across different visual observations.

It is to be understood that dynamically self-adapting the image alignment may be feasible due to the nature of the 3D-aware GAN that may synthesize view-consistent images at various cameras. The two-stage alignment disclosed herein may enable 360-degree view-consistent head synthesis with authentic shape and appearance, learnable from diverse head images with widely distributed camera poses, styles, and structures. It is also to be understood that block 520 may be a second stage of the two-stage processing of the self-adaptive camera alignment process.

It is further to be understood that for adversarial training of the full head in 360-degree, in-the-wild image exemplars are needed from a much wider range of camera distributions than the mostly frontal distribution. Therefore, the 3D (full head) GAN is trained with image collections from various sources, including being trained from widely-accessible 2D images. It is to be understood that a key to the best quality training may be accurate alignment of visual observations across images labeled with well-estimated camera parameters. For frontal face images cropping and alignment may be performed based on facial landmarks. It is further to be understood that pre-processing large-pose (i.e., a camera pose larger than a predetermined or desired threshold, e.g., such that facial landmark(s) of the images may not be detectable) images for GAN training may not be the same, since both camera estimation and image cropping may no longer be straightforward due to the lack of robust facial landmarks detection for images taken from the side and back. The two-stage processing described herein may address such issue. Processing may proceed from block 520 to block 540.

At block 530 ("Augment tri-plane representation", see also description in FIG. 2), the processor may perform feature disentanglement in tri-grid representation. It is to be understood that in the tri-plane representation, the neural radiance density and appearance of a volume point may be obtained by projecting the point's 3D coordinate over three axis-aligned orthogonal planes and decoding the sum of three bi-linearly interpolated features with an MLP. However, when synthesizing a full head in 360-degree, tri-plane representation may be limited in expressiveness and suffer from mirroring-face artifacts, especially when the camera distribution of the training images is unbalanced. The root cause may be the inductive bias originating from tri-plane projection, where one point on a 2D plane has to represent features of different 3D points. Tri-grid representation may synthesize high quality back head appearance and geometry, without mirroring-face artifacts. Processing may proceed from block 530 to block 540.

At block 540 ("Supervise a training of a rendered foreground mask", see also description in FIG. 2), the processor may perform a foreground-aware tri-discrimination.

It is to be understood that existing 3D GANs may generate images having foreground entangled with the background of synthesized images. As such, directly training the existing 3D GANs from in-the-wild RGB image collections may result in a 2.5D face. Augmenting with image supervisions from the side and back of the head also may not solve such problem because the tri-plane representation itself may not be designed to represent separated foreground and background.

To disentangle the foreground from the background, the generator 130 or the processor may generate 2D backgrounds at the same resolution of raw (unprocessed) feature image (I$^r$). During volume rendering, the renderer (140 or 250) or the processor may generate a foreground mask I$^m$ (e.g., based on the generated 2D backgrounds) by:

$$I^r(r) = \int_0^\infty w(t)f(r(t))dt, \quad I^m(r) = \int_0^\infty w(t)dt$$

$$w(t) = \exp\left(-\int_0^t \sigma(r(s))ds\right)\sigma(r(t))$$

where r(t) represents a ray emitted from the rendering camera center, and σ(·) represents density function. The renderer (140 or 250) or the processor may use the foreground mask I$^m$ to compose a new low-resolution (lower than the resolution of images generated from the tri-plane generator and super-resolution module) image I$^{gen}$.

$$I^{gen} = (1 - I^m)I^{bg} + I^r$$

In an example embodiment, the renderer (140 or 250) or the processor may feed the I$^{gen}$ into a super-resolution module (not shown) to generate a single-channel up-sampled (super-resolved) foreground mask $I^{m+}$. The renderer (140 or 250) or the processor may also feed the rendered image(s) into the super-resolution module to generate a bi-linearly up-sampled RGB image I and a super-resolved RGB image $I^+$. Since the generator may tend to synthesize foreground content in the background, the foreground-aware tri-discriminator 150 or the processor may supervise (e.g., a training of) the rendered foreground mask along with the RGB images. That is, the input of the tri-discriminator 150 has seven channels, composed with the bi-linearly up-sampled RGB image I (three channels), the super-resolved RGB image $I^+$ (three channels), and the single-channel up-sampled (super-resolved) foreground mask $I^{m+}$. The mask channel may allow the 2D segmentation prior knowledge to be back-propagated into the density distribution of the neural radiance field.

It is to be understood that the tri-discrimination process (performed by the tri-discriminator 150 or the processor) may reduce the learning difficulty in shaping the 3D full head geometry from unstructured 2D images, enabling authentic geometry and appearance synthesis of a full head composable with various backgrounds. The tri-discrimination process may decouple the background and provide both background-free (i.e., no background) geometry and/or background-switchable full head image synthesis.

Figure 6:
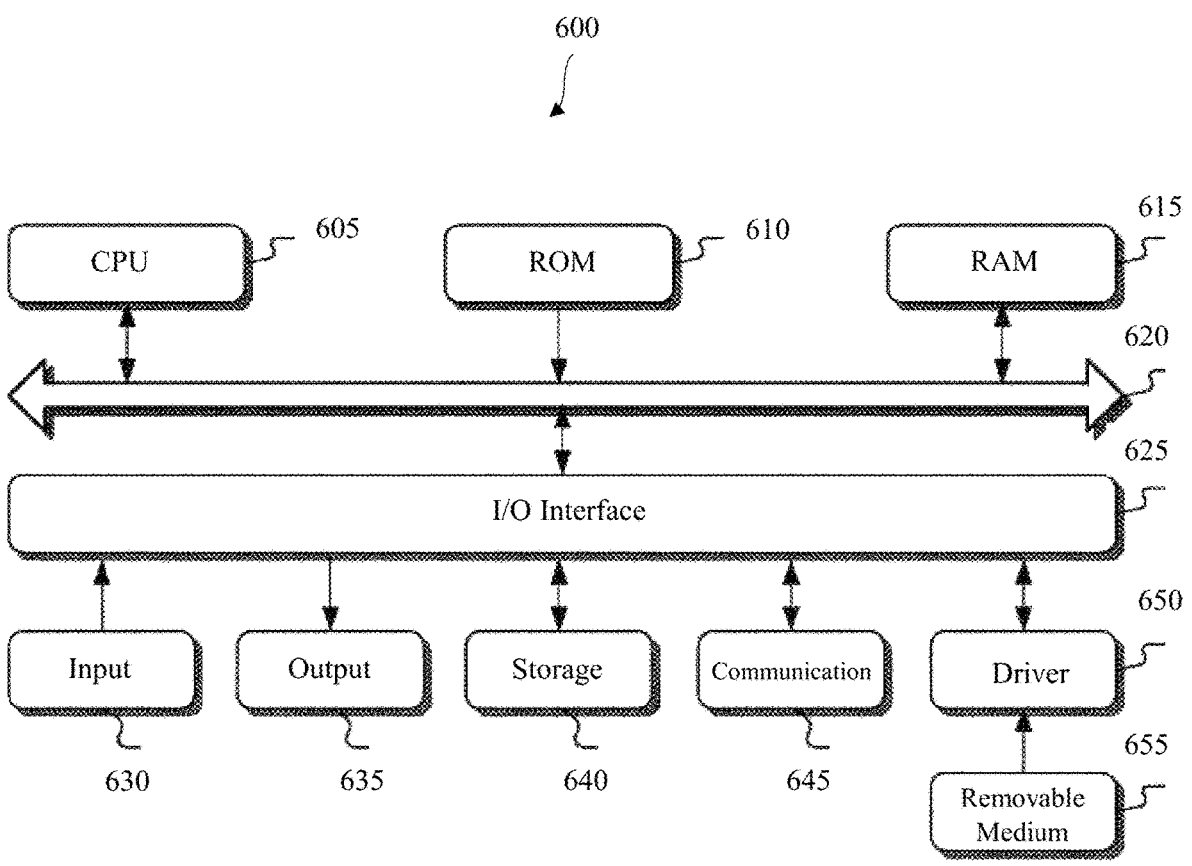
FIG. 6 is a schematic structural diagram of an example computer system applicable to implementing an electronic device, arranged in accordance with at least some embodiments described herein.

FIG. 6 is a schematic structural diagram of an example computer system 600 applicable to implementing an electronic device, arranged in accordance with at least some embodiments described herein. It is to be understood that the computer system shown in FIG. 6 is provided for illustration only instead of limiting the functions and applications of the embodiments described herein.

As depicted, the computer system 600 may include a central processing unit (CPU) 605. The CPU 605 may perform various operations and processing based on programs stored in a read-only memory (ROM) 610 or programs loaded from a storage device 640 to a random-access memory (RAM) 615. The RAM 615 may also store various data and programs required for operations of the system 600. The CPU 605, the ROM 610, and the RAM 615 may be connected to each other via a bus 620. An input/output (I/O) interface 625 may also be connected to the bus 620.

The components connected to the I/O interface 625 may further include an input device 630 including a keyboard, a mouse, a digital pen, a drawing pad, or the like; an output device 635 including a display such as a liquid crystal display, a speaker, or the like; a storage device 640 including a hard disk or the like; and a communication device 645 including a network interface card such as a LAN card, a modem, or the like. The communication device 645 may perform communication processing via a network such as the Internet, a WAN, a LAN, a LIN, a cloud, etc. In an example embodiment, a driver 650 may also be connected to the I/O interface 625. A removable medium 655 such as a magnetic disk, an optical disk, a magneto-optical disk, a semiconductor memory, or the like may be mounted on the driver 650 as desired, such that a computer program read from the removable medium 655 may be installed in the storage device 640.

It is to be understood that the processes described with reference to the flowcharts of FIG. 5 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 645, and/or may be installed from the removable medium 655. The computer program, when being executed by the central processing unit (CPU) 605, can implement the above functions specified in the method in the embodiments disclosed herein.

The features in the embodiments disclosed herein may adapt to in-the-wild full head images from arbitrary views. The 3D GAN in the embodiments disclosed herein may generate high-fidelity 360-degree RGB images and geometry, and achieve better quantitative metrics than existing methods. The model or 3D GAN in the embodiments disclosed herein may enable compelling 3D full head reconstruction from a single monocular-view.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects

It is appreciated that any one of aspects can be combined with each other.

Aspect 1. A method for generating three-dimensional (3D) synthesized images, the method comprising: pre-processing a first set of images and a second set of images by: scaling the first set of images to a predetermined size and aligning the first set of images at a center of a reference; centering a bounding box at the reference for the second set of images; and adjusting a scale and a translation of the center of the reference with constant offsets for the second set of images; and tuning a volume rendering for each image of the first and second sets of images by: associating each image with a latent code and synthesizing the latent code at a view of a camera pose; mapping a camera pose offset from the latent code and the camera pose; and generating synthesized images based on the camera pose and the camera pose offset.

Aspect 2. The method of aspect 1, further comprising: cropping the second set of images at the adjusted scale and the center of the reference.

Aspect 3. The method of aspect 1 or aspect 2, further comprising: disentangling foreground from background of the synthesized images by: generating two-dimensional backgrounds for the first and second sets of images; determining a foreground mask during the volume rendering;

supervising, by a discriminator, a training of the foreground mask with an up-sampled image and a super-resolved image.

Aspect 4. The method of aspect 3, further comprising: composing an image based on the foreground mask; generating a super-resolved foreground mask based on the composed image.

Aspect 5. The method of any one of aspects 1-4, further comprising: augmenting the tri-plane with a depth dimension.

Aspect 6. The method of any one of aspects 1-5, further comprising: generating 3D portraits from the latent code.

Aspect 7. The method of any one of aspects 1-5, further comprising: receiving a single image; generating 3D portraits from the single image.

Aspect 8. The method of aspect 7, further comprising: performing an optimization to determine an optimized latent code for the single image; and altering generator parameters with the optimized latent code.

Aspect 9. The method of any one of aspects 1-8, wherein the reference is a head of a person in the first and second sets of images, the first set of images are frontal images with facial landmarks, and the second set of images are back head images or large-pose images.

Aspect 10. The method of any one of aspects 1-9, wherein the latent code is sampled from a Gaussian distribution.

Aspect 11. The method of any one of aspects 1-10, wherein the camera pose is estimated from a set of training images.

Aspect 12. A three-dimensional (3D) generative adversarial network (GAN), the GAN comprising: a generator; a discriminator; and a renderer, wherein the generator is configured to: receive an intermediate latent code mapped from a latent code and a camera pose; generate two-dimensional backgrounds for a set of images; generate, based on the intermediate latent code, multi-grid representation features, wherein the renderer is configured to: synthesize images based on the camera pose, a camera pose offset, and the multi-grid representation features; the camera pose offset being mapped from the latent code and the camera pose; and render a foreground mask, wherein the discriminator is configured to: supervise a training of the foreground mask with an up-sampled image and a super-resolved image.

Aspect 13. The GAN of aspect 12, wherein the renderer includes a multilayer perceptron having the multi-grid representation features as input.

Aspect 14. The GAN of aspect 12 or aspect 13, wherein the discriminator is configured to receive an input having seven channels.

Aspect 15. The GAN of any one of aspects 12-14, wherein the GAN is further configured to: receive a single image; perform an optimization to determine an optimized latent code for the single image; alter parameters of the generator with the optimized latent code, and generate 3D portraits from the single image.

Aspect 16. The GAN of any one of aspects 12-15, wherein the set of images include frontal images with facial landmarks, and back head images or large-pose images.

Aspect 17. The GAN of any one of aspects 12-17, wherein the multi-grid representation is tri-plane representation augmented with a depth dimension.

Aspect 18. A non-transitory computer-readable medium having computer-executable instructions stored thereon that, upon execution, cause one or more processors to perform operations comprising: pre-processing a first set of images and a second set of images by: scaling the first set of images to a predetermined size and aligning the first set of images at a center of a reference; centering a bounding box at the reference for the second set of images; and adjusting a scale and a translation of the center of the reference with constant offsets for the second set of images; and tuning a volume rendering for each image of the first and second sets of images by: associating each image with a latent code and synthesizing the latent code at a view of a camera pose; mapping a camera pose offset from the latent code and the camera pose; and generating synthesized images based on the camera pose and the camera pose offset; disentangling foreground from background of the synthesized images by: generating two-dimensional backgrounds for the first and second sets of images; determining a foreground mask during the volume rendering; supervising, by a discriminator, a training of the foreground mask with an up-sampled image and a super-resolved image; and augmenting the tri-plane with a depth dimension.

Aspect 19. The computer-readable medium of aspect 18, wherein the operations further comprising: receiving a single image; performing an optimization to determine an optimized latent code for the single image; altering generator parameters with the optimized latent code; and generating three-dimensional portraits from the single image.

Aspect 20. The computer-readable medium of aspect 18 or aspect 19, wherein the reference is a head of a person in the first and second sets of images, the first set of images are frontal images with facial landmarks, and the second set of images are back head images or large-pose images.

Aspect 21. A method for generating three-dimensional (3D) synthesized images viewable from all angles or viewable from a predetermined limited angles, the method comprising: pre-processing a first set of images and a second set of images by: scaling the first set of images to a predetermined size and aligning the first set of images at a center of a reference; centering a bounding box at the reference for the second set of images; and adjusting a scale and a translation of the center of the reference with constant offsets for the second set of images; and tuning a volume rendering for each image of the first and second sets of images by: associating each image with a latent code and synthesizing the latent code at a view of a camera pose; mapping a camera pose offset from the latent code and the camera pose; and generating synthesized images based on the camera pose and the camera pose offset.

Aspect 22. A non-transitory computer-readable medium having computer-executable instructions stored thereon that, upon execution, cause one or more processors to perform operations comprising: pre-processing a first set of images and a second set of images; and tuning a volume rendering for each image of the first and second sets of images.

Aspect 23. A multi-viewing angle image training model comprising: a generator; a discriminator; and a renderer, wherein the generator is configured to: generate two-dimensional backgrounds for a set of images; and generate multi-grid representation features, wherein the renderer is configured to: synthesize images based on a camera pose, a camera pose offset, and the multi-grid representation features; and render a foreground mask, wherein the discriminator is configured to: supervise a training of the foreground mask with an up-sampled image and a super-resolved image.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for generating three-dimensional (3D) synthesized images, the method comprising:
  pre-processing a first set of images and a second set of images by:
    scaling the first set of images to a predetermined size and aligning the first set of images at a center of a reference;
    centering a bounding box at the reference for the second set of images; and
    adjusting a scale and a translation of the center of the reference with constant offsets for the second set of images; and
  tuning a volume rendering for each image of the first and second sets of images by:
    associating each image with a latent code and synthesizing the latent code at a view of a camera pose;
    mapping a camera pose offset from the latent code and the camera pose;
    generating synthesized images based on the camera pose and the camera pose offset; and
  disentangling a foreground from a background of the synthesized images by:
    generating two-dimensional backgrounds for the first and second sets of images;
    determining a foreground mask during the volume rendering; and
    supervising, by a discriminator, a training of the foreground mask with an up-sampled image and a super-resolved image.

2. The method of claim 1, further comprising:
cropping the second set of images at the adjusted scale and the center of the reference.

3. The method of claim 1, further comprising:
composing an image based on the foreground mask; and generating a super-resolved foreground mask based on the composed image.

4. The method of claim 1, further comprising:
augmenting a tri-plane with a depth dimension.

5. The method of claim 1, further comprising:
generating 3D portraits from the latent code.

6. The method of claim 1, further comprising:
receiving a single image; and generating 3D portraits from the single image.

7. The method of claim 6, further comprising:
performing an optimization to determine an optimized latent code for the single image; and altering generator parameters with the optimized latent code.

8. The method of claim 1, wherein the reference is a head of a person in the first and second sets of images, the first set of images are frontal images with facial landmarks, and the second set of images are back head images or large-pose images.

9. The method of claim 1, wherein the latent code is sampled from a Gaussian distribution.

10. The method of claim 1, wherein the camera pose is estimated from a set of training images.

11. A non-transitory, computer-readable medium storing one or more instructions executable by a computer system to perform one or more operations, comprising:

pre-processing a first set of images and a second set of images by:

scaling the first set of images to a predetermined size and aligning the first set of images at a center of a reference;

centering a bounding box at the reference for the second set of images; and adjusting a scale and a translation of the center of the reference with constant offsets for the second set of images; and tuning a volume rendering for each image of the first and second sets of images by:

associating each image with a latent code and synthesizing the latent code at a view of a camera pose;

mapping a camera pose offset from the latent code and the camera pose;

generating synthesized images based on the camera pose and the camera pose offset; and disentangling a foreground from a background of the synthesized images by:

generating two-dimensional backgrounds for the first and second sets of images;

determining a foreground mask during the volume rendering; and supervising, by a discriminator, a training of the foreground mask with an up-sampled image and a super-resolved image.

12. The medium of claim 11, the operations further comprising:

cropping the second set of images at the adjusted scale and the center of the reference.

13. The medium of claim 11, the operations further comprising:

composing an image based on the foreground mask; and generating a super-resolved foreground mask based on the composed image.

14. The medium of claim 11, the operations further comprising:

augmenting a tri-plane with a depth dimension.

15. The medium of claim 11, the operations further comprising:

generating 3D portraits from the latent code.

16. The medium of claim 11, the operations further comprising:

receiving a single image; and generating 3D portraits from the single image.

17. The medium of claim 16, the operations further comprising:

performing an optimization to determine an optimized latent code for the single image; and altering generator parameters with the optimized latent code.

18. The medium of claim 11, wherein the reference is a head of a person in the first and second sets of images, the first set of images are frontal images with facial landmarks, and the second set of images are back head images or large-pose images.

19. A system comprising:

one or more computers; and one or more computer memory devices interoperably coupled with the one or more computers and having computer-readable storage media storing one or more instructions that, when executed by the one or more computers, perform one or more operations comprising:

pre-processing a first set of images and a second set of images by:

scaling the first set of images to a predetermined size and aligning the first set of images at a center of a reference;

centering a bounding box at the reference for the second set of images; and adjusting a scale and a translation of the center of the reference with constant offsets for the second set of images; and tuning a volume rendering for each image of the first and second sets of images by:

associating each image with a latent code and synthesizing the latent code at a view of a camera pose;

mapping a camera pose offset from the latent code and the camera pose;

generating synthesized images based on the camera pose and the camera pose offset; and disentangling a foreground from a background of the synthesized images by:

generating two-dimensional backgrounds for the first and second sets of images;

determining a foreground mask during the volume rendering; and supervising, by a discriminator, a training of the foreground mask with an up-sampled image and a super-resolved image.

20. The system of claim 19, the operations further comprising:

composing an image based on the foreground mask; and generating a super-resolved foreground mask based on the composed image.

\* \* \* \* \*